Figure 1:
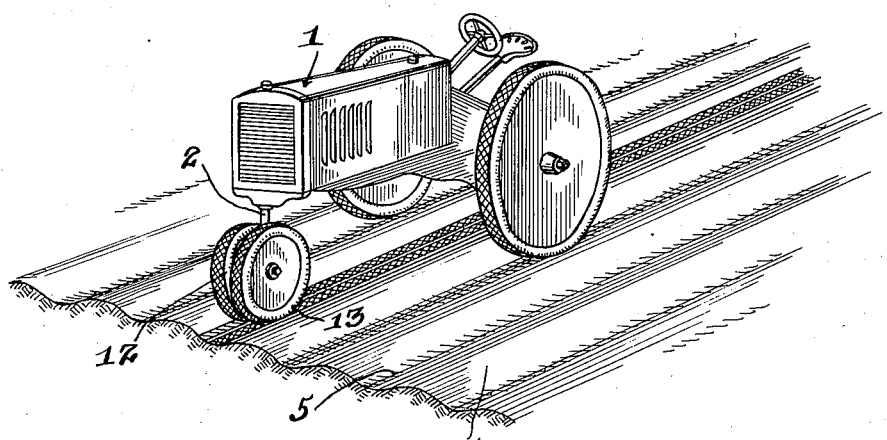

Nov. 16, 1937.   T. B. ROBERTS ET AL   2,099,625

STEERING WHEEL STRUCTURE

Filed June 8, 1937

Inventors
Turney B. Roberts
AND William A. Howard

By Kimmel & Crowell
Attorneys

Patented Nov. 16, 1937

2,099,625

UNITED STATES PATENT OFFICE 2,099,625

STEERING WHEEL STRUCTURE

Turney B. Roberts and William A. Howard, Memphis, Tex.; said Howard assignor to Howard S. Randal, Memphis, Tex.

Application June 8, 1937, Serial No. 147,081

5 Claims. (Cl. 280—97)

This invention relates to a steering wheel structure designed primarily for farm tractors, but it is to be understood that the invention is to be employed in any connection for which it may be found applicable.

As is well known a farm tractor equipped with a pair of wheels on the type of front axle now generally used or with a single front wheel, the tractor cannot be held out of the furrow after the land has been once listed or plowed and this is objectionable.

The invention aims to overcome and does overcome the foregoing objection and to this end the invention resides in providing in a manner as hereinafter set forth, a steering wheel structure for a farm tractor whereby the latter can be held in line thereby making the tractor more easily held in control.

A further object of the invention resides in the disposing of the front axle of the tractor in a manner whereby the tires of the front wheels of the tractor will wedge together giving the latter the balance of a two-wheel equipment and the traction surface effect of one wheel, whereby the front wheels wedging together hold each other in line so that one or the other is not pulling up into the furrow, but each holds the other in line and which effect is of great value in any plowed or loose ground and is especially effective in sandy land.

A further object of the invention is to provide in a manner as hereinafter set forth, a steering wheel structure for farm tractors including a pair of wheels and a pair of front axles disposed at opposite inclinations for supporting the wheels in a wedge-like manner.

Further objects of the invention are to provide in a manner as hereinafter set forth, a steering wheel structure which is comparatively simple in its construction and arrangement, strong, durable, compact, readily assembled, thoroughly efficient for the purpose intended thereby, and comparatively inexpensive to set up.

With the foregoing and other objects in view, the invention consists of the novel construction, combination and arrangement of parts as will be more specifically described and are as illustrated in the accompanying drawing, wherein is shown an embodiment of the invention, but it is to be understood that changes, variations and modifications may be resorted to which fall within the scope of the invention as claimed.

In the drawing:—

Figure 2:
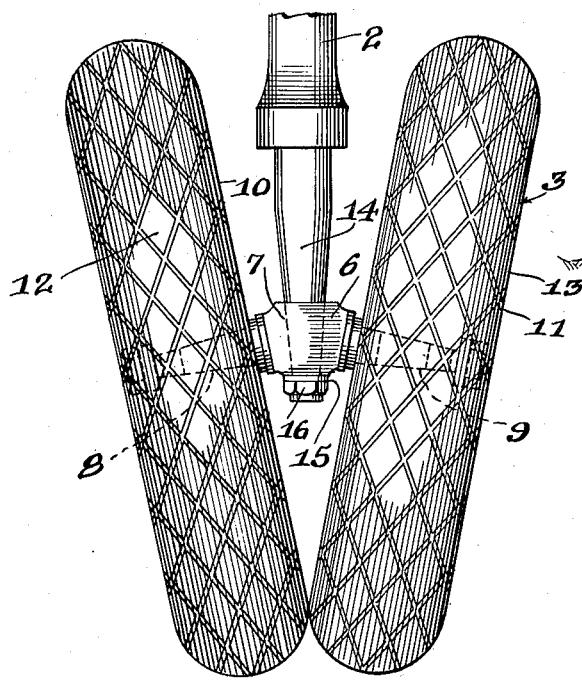
Figure 3:
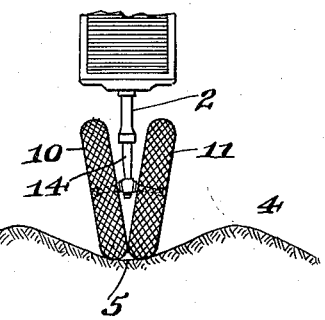
Figure 4:
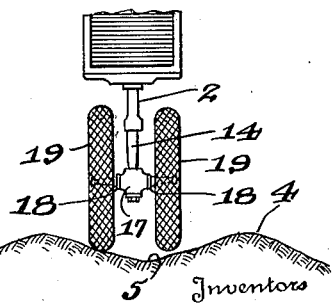

Figure 1 is a perspective view of a tractor showing the adaptation therewith of a steering wheel structure in accordance with this invention and with the tractor arranged upon the simulation of a listed or plowed land and the position of the steering wheel structure relative to a furrow, Figure 2 is a front elevation of a steering wheel structure in accordance with this invention, Figure 3 is a front elevation of the steering wheel structure in accordance with this invention, showing the position of the wheels of the said structure relative to a furrow, and Figure 4 is a front elevation illustrating the arrangement of a pair of front or steering wheels now generally employed and with the position of such steering wheels relative to a furrow.

Referring to the drawing in detail, 1 generally indicates a farm tractor provided with a rotatable steering post 2 to which is rigidly secured a steering wheel structure, in accordance with this invention, generally indicated at 3. With reference to Figures 1 and 3, 4 indicates a simulation of a listed or plowed stretch of land formed with furrows 5.

The steering wheel structure 3 includes a carrier 6 formed centrally therethrough with a vertically disposed opening 7 which gradually increases in diameter from the bottom to the top of the carrier 6. Fixedly secured to the sides of the carrier 6 is a pair of oppositely extending downwardly inclined axles 8, 9 upon which are revolubly mounted and retained steering wheels 10, 11 respectively. The tires of the wheels 10, 11 are indicated at 12, 13 respectively and are resilient. The wheels may be solid or of the pneumatic type. The pitch of the axles 8, 9 is such to provide for the wheels 10, 11 extending towards each other at an inclination from their upper ends and with their lower portions in wedging or abutting engagement.

The post 2 has its lower terminal portion 14 gradually increasing in diameter from its lower end. The portion 14 extends through opening 7 and has wedging engagement therewith. The portion 14 extends below the carrier 6 and carries a washer 15 and a clamping nut 16. The carrier 6 and wheels 10, 11 are bodily shifted with the post 2.

The arrangement of the carrier 6, wheels 10 and 11 relative to the post 2 will achieve the advantages and functions in a manner as referred to.

With reference to Figure 4, a carrier 17 is provided with a pair of oppositely disposed fixed axles 18 aligning throughout with the longitudinal median of carrier 17. Upon the axles 18 are mounted the wheels 19 which are disposed in equi-distant spaced parallel relation with respect to the post 2. The arrangement shown in Figure 4 is of a known type and open to the objections heretofore referred to.

What we claim is:—

1. In a steering wheel structure for farm tractors, a carrier adapted to be secured to a steering post, a pair of oppositely extending downwardly inclined axles fixed at their inner ends to said carrier, and a pair of inner sidewise opposed oppositely inclined revoluble steering wheels carried by said axles and having the successive lower portions of the faces of the inner sides thereof, during the revolving of the wheels in permanent wedging engagement.

2. In a steering wheel structure for farm tractors, a carrier adapted to be secured to a steering post, a pair of oppositely extending downwardly inclined axles fixed at their inner ends to said carrier, and steering wheels carried by said axles and each extending at an inward inclination from its top to its bottom, the pitch of said axles being such to provide for said wheels wedging together to hold each other in a line so that one or the other is not pulling up.

3. In a steering wheel structure for farm tractors, a carrier adapted to be secured to a steering post, a pair of oppositely extending downwardly inclined axles fixed at their inner ends to said carrier, steering wheels carried by said axles and each extending at an inward inclination from its top to its bottom, each of said wheels being provided with a tire, and the pitch of said axles being such to provide said tires wedging together thereby giving the tractor the balance of a two-wheel equipment and the traction surface effect of one wheel.

4. In a steering wheel structure for tractors, a pair of revolubly mounted tired wheels disposed at opposite inward inclinations from their upper portions, the pitch of the wheels in relation to each other being such to provide for the lower portions of the inner sides of the wheel tires wedging together during the revolving of the wheels to give to the tractor the balance of a two-wheel equipment with the traction surface effect of one wheel and with the wheels coacting to hold each other in line to prevent one or the other from pulling up into a furrow.

5. In a steering structure for farm tractors, said structure including a pair of revolubly mounted steering wheels, said wheels being so mounted and so related with respect to each other to provide for the lower portions of their inner faces to wedgingly engage during the revolving thereof for holding the tractor in line to provide easy tractor control, to give to the tractor the balance of a two-wheel equipment with the traction surface effect of one wheel; to have the wheels hold each other in line and to prevent one or the other of the wheels pulling up in a furrow.

TURNEY B. ROBERTS.
WILLIAM A. HOWARD.